United States Patent
Miyamoto et al.

(10) Patent No.: US 9,695,575 B2
(45) Date of Patent: Jul. 4, 2017

(54) WORK VEHICLE AND METHOD OF CONTROLLING SAME

(71) Applicant: KOMATSU LTD., Tokyo (JP)

(72) Inventors: Shunsuke Miyamoto, Atsugi (JP); Yasunori Ohkura, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 49 days.

(21) Appl. No.: 14/891,730

(22) PCT Filed: Oct. 31, 2014

(86) PCT No.: PCT/JP2014/079094
§ 371 (c)(1),
(2) Date: Nov. 17, 2015

(87) PCT Pub. No.: WO2015/093162
PCT Pub. Date: Jun. 25, 2015

(65) Prior Publication Data
US 2016/0130786 A1  May 12, 2016

(30) Foreign Application Priority Data
Dec. 16, 2013 (JP) .................................. 2013-259384

(51) Int. Cl.
*E02F 9/20* (2006.01)
*B60K 6/365* (2007.10)
(Continued)

(52) U.S. Cl.
CPC ............ *E02F 9/2079* (2013.01); *B60K 6/365* (2013.01); *B60K 6/445* (2013.01); *B60K 6/52* (2013.01);
(Continued)

(58) Field of Classification Search
CPC .............. E02F 9/00; E02F 9/2075; E02F 3/00
See application file for complete search history.

(56) References Cited

U.S. PATENT DOCUMENTS

| 6,182,448 B1 * | 2/2001 | Ohkura ............... F16H 61/4026 60/327 |
| 2005/0279546 A1 * | 12/2005 | Tabata ................... B60K 6/445 180/65.235 |

(Continued)

FOREIGN PATENT DOCUMENTS

| CN | 1950574 A | 4/2007 |
| JP | 2006-329244 A | 12/2006 |

(Continued)

OTHER PUBLICATIONS

The Office Action for the corresponding Chinese application No. 201480029035.6, issued on Feb. 3, 2017.

(Continued)

*Primary Examiner* — Redhwan K Mawari
*Assistant Examiner* — Anshul Sood
(74) *Attorney, Agent, or Firm* — Global IP Counselors, LLP

(57) ABSTRACT

A controller includes a neutral control determination unit, a forward-reverse clutch control unit, and a commanded torque setting unit. The neutral control determination unit executes quasi-neutral control when a quasi-neutral control determination condition is satisfied. The quasi-neutral control determination condition includes cases where the forward-reverse operation member is in the neutral position. The forward-reverse clutch control unit keeps the forward-travel clutch or the reverse-travel clutch engaged during the quasi-neutral control. During quasi-neutral control, the commanded torque setting unit determines a commanded torque sent to the motor so that a neutral state is set where the output torque from the power transmission device to the travel device is kept at a prescribed value regardless of the drive power output from the engine.

13 Claims, 8 Drawing Sheets

(51) Int. Cl.
  B60K 6/445    (2007.10)
  B60K 6/52     (2007.10)
  B60L 11/14    (2006.01)
  B60W 10/02    (2006.01)
  B60W 10/08    (2006.01)
  B60W 10/10    (2012.01)
  B60W 20/00    (2016.01)
  F16H 3/72     (2006.01)
  F16H 61/02    (2006.01)
  E02F 9/22     (2006.01)
  E02F 3/28     (2006.01)
  E02F 3/42     (2006.01)
  F16H 37/10    (2006.01)

(52) U.S. Cl.
  CPC ............. *B60L 11/14* (2013.01); *B60W 10/02* (2013.01); *B60W 10/08* (2013.01); *B60W 10/10* (2013.01); *B60W 20/00* (2013.01); *E02F 3/283* (2013.01); *E02F 3/422* (2013.01); *E02F 9/2066* (2013.01); *E02F 9/2075* (2013.01); *E02F 9/2292* (2013.01); *E02F 9/2296* (2013.01); *F16H 3/727* (2013.01); *F16H 3/728* (2013.01); *F16H 61/0246* (2013.01); *F16H 2037/104* (2013.01); *F16H 2200/2035* (2013.01); *Y02T 10/6239* (2013.01); *Y02T 10/6265* (2013.01)

(56) References Cited

U.S. PATENT DOCUMENTS

| | | | |
|---|---|---|---|
| 2007/0229007 A1 | 10/2007 | Morinaga | |
| 2009/0105028 A1 | 4/2009 | Hiraki et al. | |
| 2013/0267382 A1 | 10/2013 | Inoue et al. | |
| 2014/0243125 A1* | 8/2014 | Koga | F16H 63/062 474/11 |

FOREIGN PATENT DOCUMENTS

| | | |
|---|---|---|
| JP | 2010-207030 A | 9/2010 |
| JP | 2012-126271 A | 7/2012 |
| JP | 2013-126271 A | 7/2012 |
| JP | 2013-68289 A | 4/2013 |

OTHER PUBLICATIONS

The International Search Report for the corresponding international application No. PCT/JP2014/079094, issued on Jan. 27, 2015.

* cited by examiner

WORK VEHICLE AND METHOD OF CONTROLLING SAME

CROSS-REFERENCE TO RELATED APPLICATIONS

This application is a U.S. National stage application of International Application No. PCT/JP2014/079094, filed on Oct. 31, 2014. This U.S. National stage application claims priority under 35 U.S.C. §119(a) to Japanese Patent Application No. 2013-259384, filed in Japan on Dec. 16, 2013, the entire contents of which are hereby incorporated herein by reference.

BACKGROUND

Field of the Invention

The present invention relates to a work vehicle, and more specifically to a hybrid work vehicle and a method of controlling the same.

Background Information

Work vehicles, such as wheel loaders, are known to be equipped with power transmission devices that include a torque converter and a multi-speed transmission (termed, "torque converter transmission" below). Existing work vehicles equipped with the torque converter transmission device are provided with a clutch for switching the vehicle between forward travel and reverse travel. For instance, when a forward-reverse travel lever is placed in the forward travel position, a forward-travel clutch is connected and a reverse-travel clutch is disconnected. When the forward-reverse travel lever is placed in the reverse travel position, the reverse-travel clutch is connected and the forward-travel clutch is disconnected. Moreover, when the forward-reverse travel lever is placed in the neutral position, the forward-travel clutch and the reverse-travel clutch are both disconnected. Hereby, transmission of the drive power from the engine to the travel device is shutoff.

Whereas, in recent years, hybrid work vehicles have been proposed where the drive power from the engine and the drive power from a motor serve as the power transmission to run the vehicle instead of the torque converter transmission. For example, Japanese Unexamined Patent Application Publication No. 2006-329244 discloses a hydraulic mechanical transmission (HMT), and alternatively an electro-mechanical transmission (EMT) as the power transmission device of the hybrid work vehicles.

The HMT includes a planetary gear mechanism, and a first pump-motor and a second pump-motor connected to the rotational elements in the planetary gear mechanism. The first pump-motor and the second pump-motor function as either a hydraulic motor or a hydraulic pump depending on the travel state of the work vehicle. The HMT continuously varies the rotation speed of the output shafts to thereby change the rotation speed of the pump-motors.

The EMT uses an electric motor in place of the hydraulic motor in the HMT. That is, the EMT includes a first generator-motor and a second generator-motor. The first generator-motor and the second generator-motor function as either an electric motor or an electric generator depending on the travel state of the work vehicle. Similarly to the HMT, the EMT continuously varies the rotation speed of the output shafts to thereby change the rotation speed of the generator-motors.

SUMMARY

The existing torque converter transmission disengages the clutch when the forward-reverse travel lever is in the neutral position. Therefore, time is needed to increase the hydraulic pressure used to drive the clutch when re-engaging the clutch. Alternatively, time may be needed to reduce the rotation speed differential when the clutch is partially engaged to connect rotational elements having a rotation speed differential with each other by the clutch. Accordingly, the time needed to re-engage the clutch does not allow the transmission of drive power to be initiated quickly when switching the power transmission device from the neutral state to the forward-travel state or the reverse-travel state.

Additionally, when the clutch is disengaged while the forward-reverse travel lever is in the neutral position, the motor may be controlled when re-engaging the clutch to synchronize the relative rotation speed of the clutch before engaging the same in the hybrid work vehicle. Despite that, even in this case, synchronizing the relative rotation speed of the clutch takes time, and does not allow the transmission of drive power to be initiated quickly.

The present invention proposes a work vehicle and a method of controlling the same, whereby the transmission of drive power may be initiated quickly when the power transmission device is switched from a neutral state to a forward-travel state or to a reverse-travel state.

A work vehicle according to an exemplary embodiment of the invention includes an engine, a hydraulic pump, a work implement, a travel device, a power transmission device, a controller, and a forward-reverse operation member. The hydraulic pump is driven by the engine. The work implement driven by hydraulic fluid discharged from the hydraulic pump. The travel device is driven by the engine. The power transmission device transmits the drive power from the engine to the travel device. The controller controls the power transmission device. The forward-reverse operation member changes the state of the vehicle to a forward travel state, a reverse travel state, or a neutral state and is configured to selectively switch between a forward-travel position, a reverse-travel position, and a neutral position. The power transmission device includes an input shaft, an output shaft, a gear mechanism, a motor, and a forward-reverse switching mechanism. The gear mechanism includes a planetary gear mechanism and transmits the rotation of the input shaft to the output shaft. The motor is connected to a rotational element in the planetary gear mechanism. The forward-reverse switching mechanism includes a forward-travel clutch, and a reverse-travel clutch. When the vehicle is traveling forward the forward-travel clutch is engaged and the reverse-travel clutch is disengaged. When the vehicle is traveling in reverse the forward-travel clutch is disengaged and the reverse-travel clutch is engaged. The power transmission device may be configured so that varying the rotation speed of the motor varies the rotation speed ratio of the output shaft to the input shaft. The controller includes a neutral control determination unit, a forward-reverse clutch control unit, and a commanded torque setting unit. The neutral control determination unit executes quasi-neutral control when a quasi-neutral control determination condition is satisfied. The quasi-neutral control determination condition includes cases where the forward-reverse operation member is in the neutral position. The forward-reverse clutch control unit keeps the forward-travel clutch or the reverse-travel clutch engaged during the quasi-neutral control. During quasi-neutral control, the commanded torque setting unit determines a commanded torque sent to the motor so that a neutral state is set where the output torque from the power transmission device to the travel device is kept at a prescribed value regardless of the drive power output from the engine.

In the work vehicle according to the exemplary embodiment, quasi-neutral control provides a simulated neutral state, where the output torque from the power transmission device to the travel device is kept small regardless of the drive power output from the engine while the forward-travel clutch or the reverse-travel clutch is kept engaged. Therefore, carrying out the quasi-neutral control, a state may be maintained where the output torque to the travel device is suppressed even while the rotation speed of the engine increases to drive to the work implement. In addition, the transmission of drive power may be initiated quickly when switching the power transmission device from the neutral state to the forward-travel state or the reverse-travel state.

The quasi-neutral control determination condition may preferably include that the vehicle speed is no less than a prescribed speed threshold. In this case, the transmission of drive power may be initiated quickly in situations where the operator desires a prompt increase or a prompt decrease in speed when the work vehicle is running.

The neutral control determination unit may preferably executes real neutral control when a real neutral control determination condition is satisfied. The real neutral control determination condition may include that the forward-reverse operation member is in the neutral position, and that the vehicle speed is less than a prescribed speed threshold. During real neutral control, the forward-reverse clutch control unit disengages the forward-travel clutch and the reverse-travel clutch. In this case, the transmission of drive power may be more reliably controlled in situations where the operator does not wish for a prompt increase or a prompt decrease in speed, such as while the work vehicle is stopped, or immediately before the work vehicle is to stop.

When the vehicle speed changes from a value less than a prescribed speed threshold to a value greater than or equal to the prescribed speed threshold while the real neutral control determination condition is satisfied, the neutral control determination unit may preferably switch from real neutral control to quasi-neutral control. In this case, the transmission of drive power may be initiated quickly after a large increase in the vehicle speed when the forward-reverse operation member is switched from the neutral position to a forward-travel position or a reverse-travel position.

The forward-reverse clutch control unit may preferably synchronize and then engage the forward-travel clutch or the reverse-travel clutch when the neutral control switches from real neutral control to quasi-neutral control. Here, it is possible to suppress the shock generated when engaging the clutch.

The work vehicle may preferably further include an output rotation speed detector. The output rotation speed detector detects the output rotation speed that is the rotation speed of the output shaft of the power transmission device. The controller may also include a storage unit. The storage unit may store a required traction force characteristic defining the relationship between the output rotation speed and a required traction force. The commanded torque setting unit determines a commanded torque sent to the motor to obtain a required traction force corresponding to the output rotation speed. A required traction force characteristic information includes a first required traction force characteristic and a second required traction force characteristic. The first required traction force characteristic defines the relationship between the output rotation speed and the required traction force during normal driving control where no quasi-neutral control is carried out. The second required traction force characteristic defines the relationship between the output rotation speed and the required traction force during quasi-neutral control. In this case, controlling the commanded torque sent to the motor allows the traction force of the work vehicle during quasi-neutral control to be kept small. Hereby, the output torque from the power transmission device to the travel device may be kept in a predetermined neutral state regardless of the drive power output from the engine. Additionally, the traction force may be controlled during quasi-neutral control on the basis of a second required traction force characteristic, which is different from the first required traction force characteristic during normal driving control.

The second required traction force characteristic may preferably be established to generate a deceleration force in the work vehicle. In this case, the traction force of the work vehicle may be controlled so that a deceleration force is generated during quasi-neutral control.

The work vehicle may preferably be further provided with an accelerator operation member, and an acceleration operation detector for detecting an accelerator operation amount. The first required traction force characteristic varies in accordance with the accelerator operation amount. The second required traction force characteristic does not vary in accordance with the accelerator operation amount. Here, even when the operator manipulates the accelerator operation member during quasi-neutral control, the drive power does not change in response to operation of the accelerator operation member.

The commanded torque setting unit may preferably be configured to set the commanded torque sent to the motor during quasi-neutral control to zero, or to a prescribed value that offsets the internal inertia of the power transmission device. In this case, setting the commanded torque sent to the motor to zero or the prescribed value allows the traction force of the work vehicle to be kept small during quasi-neutral control. Hereby, the output torque from the power transmission device to the travel device may be kept in a predetermined neutral state regardless of the drive power output from the engine.

The work vehicle may preferably further include an energy storage device. The motor functions as either an electric motor or an electric generator depending on the travel state of the work vehicle. The energy storage device stores electrical energy generated by the motor. In this case, since either the forward-travel clutch or the reverse-travel clutch are engaged even if the vehicle is in quasi-neutral control, the drive power from the engine allows the motor to act as a generator.

The forward-reverse switching mechanism may preferably be placed between the engine and the motor along a route transmitting the drive power. Here, even when the forward-travel clutch and reversed-travel clutch are disengaged to switch the power transmission device to a neutral state, the motor may still rotate due to the rotation of the output shaft because the output shaft is connected to the motor. Therefore, the rotation speed of the motor must always be controlled to prevent the motor from over rotating. In this regard, the work vehicle according to the exemplary embodiment is capable of realizing a neutral state while keeping the forward-travel clutch or the reverse-travel clutch engaged through quasi-neutral control. Thus, there is no need for the above-described kind of control to prevent over rotating of the motor, thereby simplifying control of the motor.

The power transmission device may preferably further include a mode switching clutch for switching the transmission route for the drive power in the power transmission device between a high-speed mode and low-speed mode.

The controller may further include a mode switching control unit. The mode switching control unit carries out mode switching control that switches between engaging and disengaging a mode selection clutch depending on a rotation speed ratio. The mode switching control unit carries out mode switching control even during quasi-neutral control. In this case, even during quasi-neutral control a suitable mode may be selected depending on the rotation speed ratio. Hereby, the elements making up the motor and the like in the power transmission device may be prevented from over rotating during quasi-neutral control.

Another exemplary embodiment of the invention is a method of controlling a work vehicle equipped with an engine, a hydraulic pump, a work implement, a travel device, a power transmission device, and a forward-reverse operation member. The hydraulic pump is driven by the engine. The work implement is driven by hydraulic fluid discharged from the hydraulic pump. The travel device is driven by the engine. The power transmission device transmits the drive power from the engine to the travel device. The forward-reverse operation member changes the state of the vehicle to a forward travel state, a reverse travel state, or a neutral state and is configured to selectively switch between a forward-travel position, a reverse-travel position, and a neutral position. The power transmission device includes an input shaft, an output shaft, a gear mechanism, a motor, and a forward-reverse switching mechanism. The gear mechanism includes a planetary gear mechanism and transmits the rotation of the input shaft to the output shaft. The motor is connected to a rotational element in the planetary gear mechanism. The forward-reverse switching mechanism includes a forward-travel clutch, and a reverse-travel clutch. When the vehicle is traveling forward the forward-travel clutch is engaged and the reverse-travel clutch is disengaged. When the vehicle is traveling in reverse the forward-travel clutch is disengaged and the reverse-travel clutch is engaged. The power transmission device may be configured so that varying the rotation speed of the motor varies the rotation speed ratio of the output shaft to the input shaft. A control method according to the exemplary embodiment includes first through third steps. In the first step, quasi-neutral control is executed when a quasi-neutral control determination condition is satisfied. The quasi-neutral control determination condition includes cases where the forward-reverse operation member is in the neutral position. In the second step, the forward-travel clutch or the reverse-travel clutch are kept engaged during the quasi-neutral control. In the third step, during quasi-neutral control, a commanded torque sent to the motor is determined so that a neutral state is set where the output torque from the power transmission device to the travel device is kept at a prescribed value regardless of the drive power output from the engine.

In a method of controlling a work vehicle according to the exemplary embodiment, quasi-neutral control provides a simulated neutral state, where the output torque from the power transmission device to the travel device is kept small regardless of the drive power output from the engine while the forward-travel clutch or the reverse-travel clutch is kept engaged. Therefore, carrying out the quasi-neutral control, a state may be maintained where the output torque to the travel device is suppressed even while the rotation speed of the engine increases to drive the work implement. In addition, the transmission of drive power may be initiated quickly when switching the power transmission device from the neutral state to the forward-travel state or the reverse-travel state.

According to exemplary embodiments of the present invention, a work vehicle and a method of controlling the same may be provided whereby the transmission of drive power may be initiated quickly when the power transmission device is switched from a neutral state to a forward-travel state or to a reverse-travel state.

DESCRIPTION OF EXEMPLARY EMBODIMENTS

Figure 1:
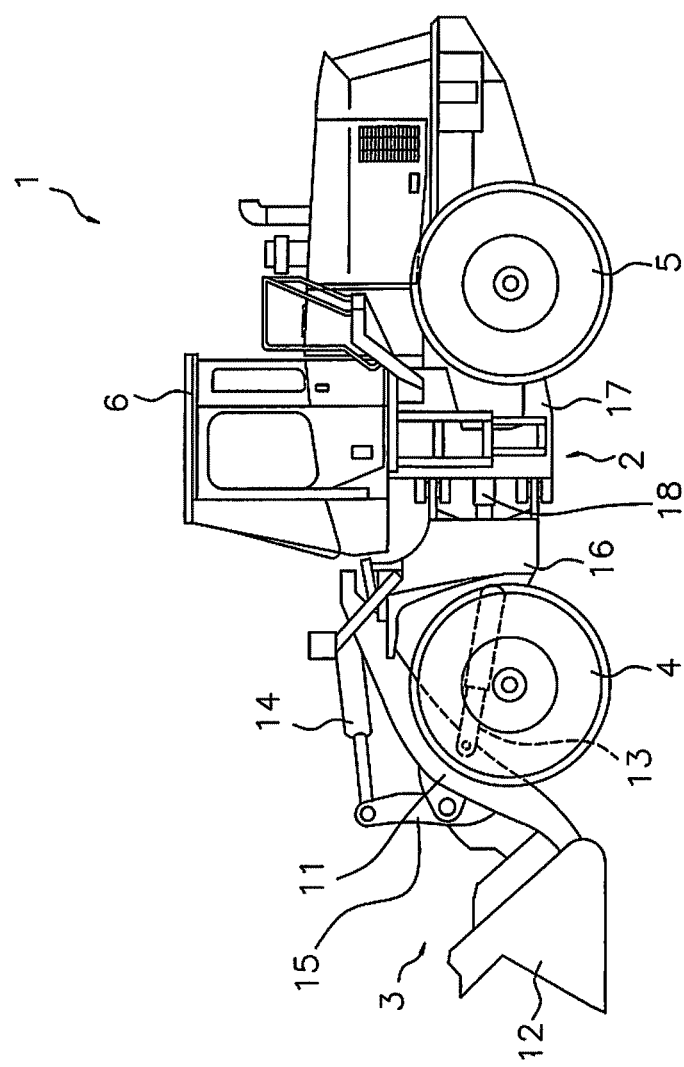
FIG. 1 is a side view illustrating a work vehicle according to the exemplary embodiments of the present invention.

Exemplary embodiments of the present invention are described below with reference to the drawings. FIG. 1 is a side view illustrating a work vehicle 1 according to the exemplary embodiments. As illustrated in FIG. 1 the work vehicle 1 is provided with a vehicle frame 2, a work implement 3, running wheels 4, 5, and a cab 6. The work vehicle 1 is a wheel loader, and travels by rotationally driving the running wheels 4, 5. The work vehicle 1 uses the work implement 3 to perform work, such as excavation or digging.

The work implement 3 and the running wheels 4, 5 are attached to the vehicle frame 2. The work implement 3 is driven by hydraulic fluid from a later-described work implement pump 23 (refer to FIG. 2). A boom 11 and a bucket 12 are provided on the work implement 3. The boom 11 is mounted to the vehicle frame 2. The work implement 3 is provided with a lift cylinder 13, and a bucket cylinder 14. The lift cylinder 13 and the bucket cylinder 14 are hydraulic cylinders. One end of the lift cylinder 13 is attached to the vehicle frame 2. The other end of the lift cylinder 13 is attached to the boom 11. Hydraulic fluid from the work implement pump 23 extends and retracts the lift cylinder 13 to thereby rotate the boom 11 vertically. A bucket 12 is attached at the front end of the boom 11. One end of the bucket cylinder 14 is attached to the vehicle frame 2. The other end of the bucket cylinder 14 is attached to the bucket 12 via a bell crank 15. Hydraulic fluid from the work implement pump 23 extends and retracts the bucket cylinder 14 to thereby rotate the bucket 12 vertically.

The cab 6 is attached to the vehicle frame 2. The cab 6 is mounted on the vehicle frame 2. Arranged within the cab 6 are a seat whereon an operator may sit, an operation device (later described), and the like. The vehicle frame 2 includes a front frame 16 and a rear frame 17. The front frame 16 and the rear frame 17 are attached to be able to turn relative to each other horizontally.

The work vehicle 1 includes a steering cylinder 18. The steering cylinder 18 is attached to the front frame 16 and the rear frame 17. The steering cylinder 18 is also a hydraulic cylinder. Hydraulic fluid from a later-described steering pump 30 extends and retracts the steering cylinder 18 to thereby change the travel direction of the work vehicle 1 to the left or the right.

Figure 2:
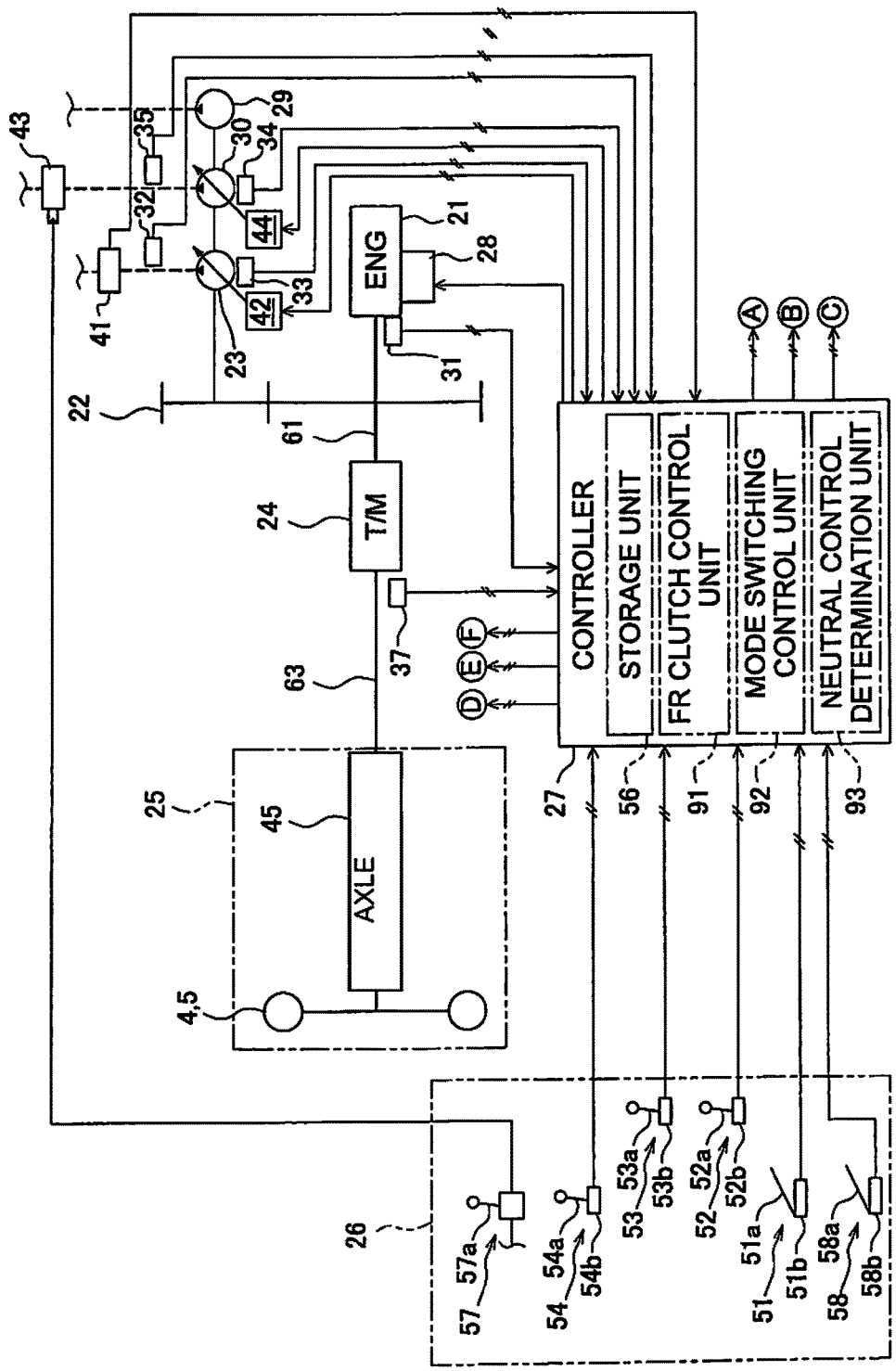
FIG. 2 is a schematic view illustrating a configuration of the work vehicle.

FIG. 2 is a schematic view illustrating a configuration of the work vehicle 1. As illustrated in FIG. 2, the work vehicle 1 is equipped with an engine 21, a Power Take Off device 22 (termed "PTO 22" below), a power transmission device 24, a travel device 25, operation device 26, a controller 27, and the like.

The engine 21 may be a diesel engine. The output of the engine 21 is controlled by adjusting the amount of fuel injected into a cylinder in the engine 21. The amount of fuel may be adjusted via the controller 27 controlling a fuel injector 28 installed in the engine 21. The work vehicle 1 may further includes an engine rotation speed detector 31. The engine rotation speed detector 31 detects the rotation speed of the engine and sends the controller 27 a detection signal indicative of the engine rotation speed.

The work vehicle 1 includes the work implement pump 23, the steering pump 30, and a transmission pump 29. The work implement pump 23, the steering pump 30, and the transmission pump 29 are hydraulic pumps. The PTO 22 (Power Take Off) transmits a portion of the drive power from the engine 21 to the hydraulic pumps 23, 30, 29. In other words, the PTO 22 distributes the drive power from the engine 21 to the hydraulic pumps 23, 30, 29, and to the power transmission device 24.

The work implement pump 23 is driven by drive power from the engine 21. The hydraulic fluid discharged from the work implement pump 23 is supplied to the above-described lift cylinder 13 and the bucket cylinder 14 via a work implement control valve 41. The work vehicle 1 is equipped with a work implement-pump pressure detector 32. The work implement-pump pressure detector 32 detects the discharge pressure of the hydraulic fluid expelled from the work implement pump 23 (referred to as "work implement pump pressure" below), and sends the controller 27 a detection signal indicative of the work implement pump pressure.

The work implement pump 23 is a variable displacement hydraulic pump. Changing the tilt angle of the swashplate or the tilt axis in the work implement pump 23 changes the discharge capacity of the work implement pump 23. The work implement pump 23 is connected to a first capacity control device 42. The first capacity control device 42 changes the tilt angle in the work implement pump 23 under the control of the controller 27. The controller 27 may thereby control the discharge capacity of the work implement pump 23. The work vehicle 1 is equipped with a first tilt-angle detector 33. The first tilt-angle detector 33 detects the tilt angle in the work implement pump 23 and sends the controller 27 a detection signal representing the tilt angle.

The steering pump 30 is driven by drive power from the engine 21. The hydraulic fluid discharged from the steering pump 30 is supplied to the steering cylinder 18 via a steering control valve 43. The work vehicle 1 is equipped with a steering pump pressure detector 35. The steering pump pressure detector 35 detects the discharge pressure of the hydraulic fluid discharged from the steering pump 30 (termed "steering pump pressure" below), and sends the controller 27 a detection signal indicative of the steering pump pressure.

The steering pump 30 is a variable displacement hydraulic pump. Changing the tilt angle of the swashplate or the tilt axis in the steering pump 30 changes the discharge capacity of the steering pump 30. The steering pump 30 is connected to a second capacity control device 44. The second capacity control device 44 changes the tilt angle in the steering pump 30 under the control of the controller 27. The controller 27 thereby controls the discharge capacity of the steering pump 30. The work vehicle 1 is equipped with a second tilt-angle detector 34. The second tilt-angle detector 34 detects the tilt angle in the steering pump 30 and sends the controller 27 a detection signal representing the tilt angle.

The transmission pump 29 is driven by the drive power from the engine 21. The transmission pump 29 is a fixed displacement hydraulic pump. The hydraulic fluid discharged from the transmission pump 29 is supplied to clutches CF, CR, CL, CH in the power transmission device 24 via later-described clutch control valves VF, VR, VL, VH.

The PTO 22 transmits a portion of the drive power from the engine 21 to the power transmission device 24. The power transmission device 24 transmits the drive power from the engine 21 to the travel device 25. The power transmission device 24 changes the speed of the drive power from the engine 21 and outputs the results. The details on the configuration of the power transmission device 24 are described later.

The travel device 25 includes an axle 45 and running wheels 4, 5. The axle 45 transmits the drive power from the power transmission device 24 to the running wheels 4, 5. Hereby, the running wheels 4, 5 rotate. The work vehicle 1 is equipped with a vehicle-speed detector 37. The vehicle-speed detector 37 detects the rotation speed of the output shaft 63 (termed "output rotation speed" below) in the power transmission device 24. Given that the output rotation speed corresponds to the vehicle speed, the vehicle-speed detector 37 detects the vehicle speed by detecting the output rotation speed. The vehicle-speed detector 37 also detects the rotation direction of the output shaft 63. The rotation direction of the output shaft 63 corresponds to the travel direction of the work vehicle 1; therefore, the vehicle-speed detector 37 functions as a travel direction detector detecting the travel direction of the work vehicle 1 by detecting the rotation direction of the output shaft 63. The vehicle-speed detector 37 sends the controller 27 a detection signal indicative of the output rotation speed and the rotation direction.

The operator manipulates the operation device 26. The operation device 26 contains an acceleration operation device 51, a work implement operation device 52, a speed change operation device 53, a forward-reverse travel operation device 54 ("FR operation device 54" below), a steering operation device 57, and a braking operation device 58.

The acceleration operation device 51 includes an accelerator operation member 51a, and an acceleration operation detector 51b. The accelerator operation member 51a is operated to establish a target rotation speed for the engine 21. The acceleration operation detector 51b detects the degree to which the accelerator operation member 51a is operated (termed "accelerator operation amount" below). The acceleration operation detector 51b sends the controller 27 a detection signal indicative of the accelerator operation amount.

The work implement operation device 52 contains a work implement operation member 52a and a work implement operation detector 52b. The work implement operation member 52a is operated to move the work implement 3. The work implement operation detector 52b detects the position of the work implement operation member 52a. The work implement operation detector 52b detects the position of the work implement operation member 52a. The work implement operation detector 52b detects the position of the work implement operation member 52a to thereby detect the degree to which the work implement operation member 52a was operated.

The speed change operation device 53 includes a speed change operation member 53a, and a speed change operation detector 53b. The operator may manipulate the speed change operation member 53a to select a range of speeds for the power transmission device 24. The speed change operation detector 53b detects the position of the speed change operation member 53a. The positions of the speed change operation member 53a correspond to a plurality of speed ranges, such as a first speed and a second speed. The speed change operation detector 53b outputs a detection signal to the controller 27 representing the position of the speed change operation member 53a.

The FR operation device 54 includes a forward-reverse operation member 54a ("FR operation member 54a" below), and a forward-reverse travel position detector 54b ("FR position detector 54b" below). The operator may manipulate the FR operation member 54a to thereby switch the work vehicle 1 between forward travel and reverse travel. The FR operation member 54a may be selectively switched to a forward-travel position (F), a neutral position (N), and a reverse-travel position (R). The FR position detector 54b detects the position of the FR operation member 54a. The FR position detector 54b outputs a detection signal to the controller 27 representing the position of the FR operation member 54a.

The steering operation device 57 includes a steering operation member 57a. The steering operation device 57 supplies a pilot hydraulic pressure to the steering control valve 43 based on the operation of the steering operation member 57a to thereby drive the steering control valve 43. Note that the steering operation member 57 may convert the operation of the steering operation member 57a into an electrical signal to drive the steering control valve 43. The operator may manipulate the steering operation member 57a to change the travel direction of the work vehicle 1 to the left or the right.

The braking operation device 58 includes a brake operation member 58a, and a braking operation detector 58b. The operator may manipulate the brake operation member 58a to control the braking force of the work vehicle 1. The braking operation detector 58b detects the degree to which the brake operation member 58a is operated (termed "brake operation amount" below). The braking operation detector 58b outputs a detection signal to the controller 27 indicative of the brake operation amount. Note that the brake oil pressure may be used as the brake operation amount.

The controller 27 includes a computing device, such as a CPU, and memory, such as RAM and ROM, and carries out various processes for controlling the work vehicle 1. The controller 27 also includes a storage unit 56. The storage unit 56 stores programs and data for controlling the work vehicle 1.

The controller 27 sends a fuel injector 28 a command signal indicative of a commanded throttle value to obtain a target rotation speed in the engine 21 corresponding to the accelerator operation amount. The details regarding the control of the engine 21 by the controller 27 are described later.

The controller 27 controls the work implement control valve 41 on the basis of a detection signal from the work implement operation detector 52b and thereby controls the hydraulic pressure supplied to the hydraulic cylinders 13, 14. The hydraulic cylinders 13, 14 thereby extend and retract, moving the work implement 3.

The controller 27 also controls the power transmission device 24 on the basis of the detection signal from the detectors. The details regarding the control of the power transmission device 24 by the controller 27 are described later.

Figure 3:
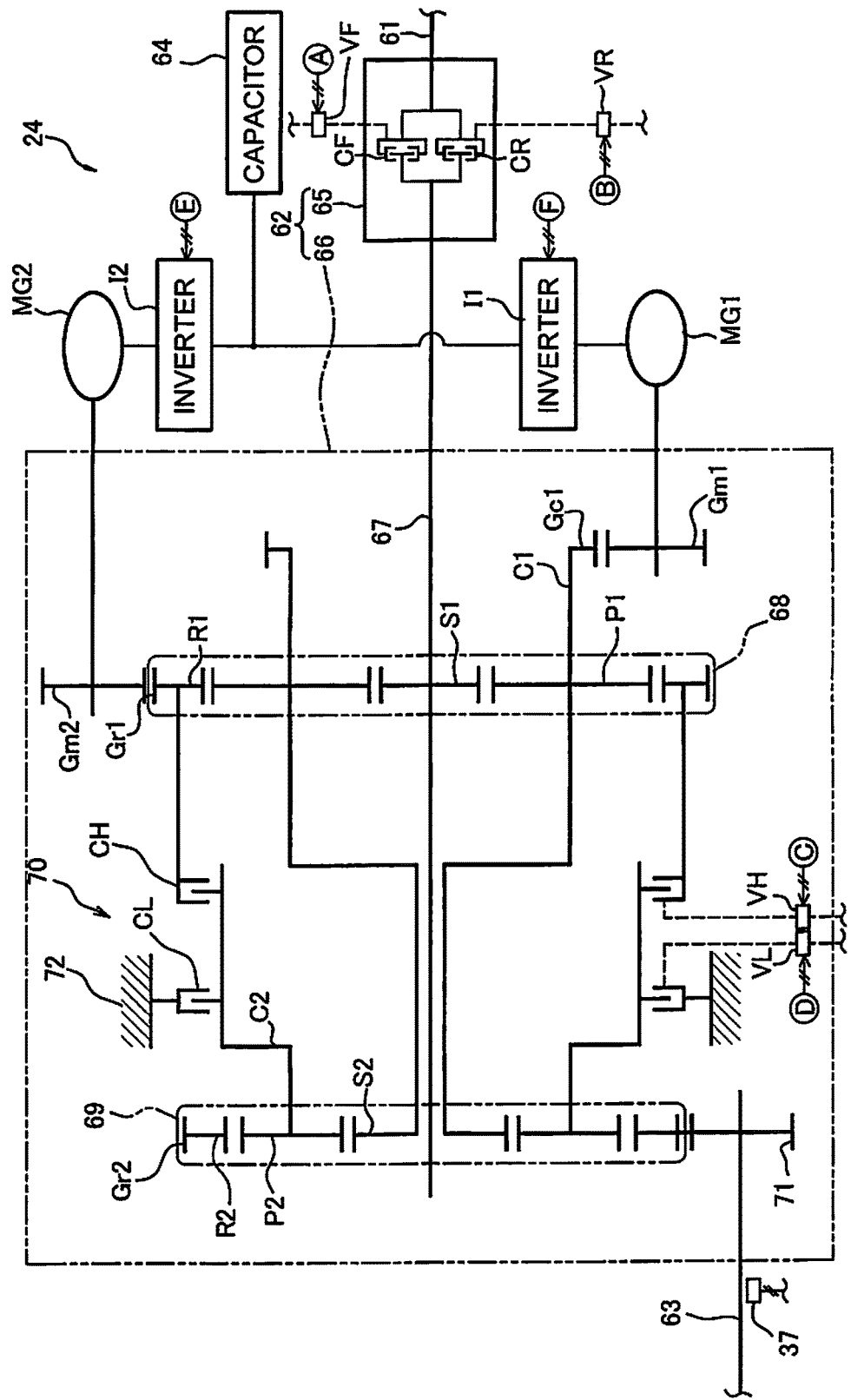
FIG. 3 is a schematic view illustrating a configuration of a power transmission device.

The details on the configuration of the power transmission device 24 are described next. FIG. 3 is a schematic view illustrating a configuration of a power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above described PTO 22. The rotations of the engine 21 are received by the input shaft 61 via the PTO 22. The gear mechanism 62 transmits the rotations of the input shaft 61 to the output shaft 63. The output shaft 63, connected to the above-described travel device 25, transmits the rotations from the gear mechanism 62 to the travel device 25.

The gear mechanism 62 transmits the drive power from the engine 21. The gear mechanism is configured to vary the rotation speed ratio of the output shaft 63 in relation to the input shaft 61 in accordance with the variations in the rotation speed of the motors MG1, MG2. The gear mechanism 62 includes an FR switching mechanism 65, and a speed change mechanism 66.

The FR switching mechanism 65 is placed between the engine 21 and the first planetary gear mechanism 68 along a route transmitting the drive power. The FR switching mechanism 65 includes a forward travel clutch CF (termed "F-clutch CF", below), a reverse travel clutch CR (termed "R-clutch CR", below), and various gears (not shown). The F-clutch CF and the R-clutch CR are hydraulic clutches, with the transmission pump 29 supplying the hydraulic fluid to each of clutches CF, CR. An F-clutch control valve VF controls the hydraulic fluid supplied to the F-clutch CF. An R-clutch control valve VR controls the hydraulic fluid supplied to the R-clutch CR. The clutch control valves VF, VR are controlled via the command signals from the controller 27.

Engaging and disengaging the F-clutch CF and engaging and disengaging the R-clutch CR changes the direction of rotation output from the FR switching mechanism 65. More specifically, as illustrated in FIG. 2, the controller 27 includes a forward-reverse clutch control unit 91 (termed "FR clutch control unit 91"). The FR clutch control unit 91 controls the engaging and disengaging of the F-clutch CF and the R-clutch CR respectively depending on the position of the FR operation member 54a. When the FR operation member 54a is in the forward-travel position, the FR clutch control unit 91 engages the F-clutch CF and disengages the R-clutch CR. When the FR operation member 54a is in the reverse-travel position, the FR clutch control unit 91 disengages the F-clutch CF and engages the R-clutch CR.

The speed change mechanism 66 includes a power transmission shaft 67, a first planetary gear mechanism 68, a second planetary gear mechanism 69, a Hi-Lo switching mechanism 70, and an output gear 71. The power transmission shaft 67 is connected to the FR switching mechanism 65. The first planetary gear mechanism 68 and the second planetary gear mechanism 69 are arranged on the same axis as the power transmission shaft 67.

The first planetary gear mechanism 68 includes a first sun gear S1, a plurality of first planetary gears P1, a first carrier C1 supporting the plurality of first planetary gears P1, and a first ring gear R1. The first sun gear S1 is connected to the power transmission shaft 67. The plurality of first planetary gears P1 engages with the first sun gear S1 and is supported on the first carrier C1 to be able to rotate. A first carrier gear Gc1 is provided on the outer periphery of the first carrier C1. The first ring gear R1 is able to rotate while engaged with the plurality of planetary gears P1. The first ring gear R1 also is provided with a first outer periphery ring gear Gr1 at the outer periphery thereof.

The second planetary gear mechanism 69 includes a second sun gear S2, a plurality of second planetary gears P2, a second carrier C2 supporting the plurality of second planetary gears P2, and a second ring gear R2. The second sun gear S2 is connected to the first carrier C1. The plurality of second planetary gears P2 engages with the second sun gear S2 and is supported on the second carrier C2 to be able to rotate. The second ring gear R2 is able to rotate while engaged with the plurality of planetary gears P2. The second ring gear R2 also is provided with a second outer periphery ring gear Gr2 at the outer periphery thereof. The second outer periphery ring gear Gr2 engages with the output gear 71 whereby the rotation of the second ring gear R2 is output to the output shaft 63 via the output gear 71.

The Hi-Lo switching mechanism 70 switches the drive power transmission route in the power transmission device 24 between a high-speed mode (Hi mode), where the vehicle speed is high, and the low-speed mode (Lo mode) where the vehicle speed is low. The Hi-Lo switching mechanism 70 includes an H-clutch CH which is connected during the Hi mode, and an L-clutch CL which is connected during the Lo mode. The H-clutch CH engages or disengages the first ring gear R1 and the second carrier C2. Additionally, the L-clutch CL engages or disengages the second carrier C2 and a fixed end 72, thereby prohibiting or permitting rotation of the second carrier C2.

The clutches CH, CL are hydraulic clutches, with the transmission pump 29 supplying the hydraulic fluid thereto. The hydraulic fluid bound for the H-clutch CH is controlled by an H-clutch control valve VH. The hydraulic fluid bound for the L-clutch CL is controlled by an L-clutch CL control valve VL. The clutch control valves VH, VL are controlled via the command signals from the controller 27.

The first motor MG1 and the second motor MG2 are drive motors that generate drive power from electrical energy. The first motor MG1 and the second motor MG2 are also generators that use the drive power input therein to generate electrical energy. The controller 27 may provide a command signal to the first motor MG1 causing a torque reversed from the rotation direction of the first motor MG1 to act thereon. In this case, the first motor MG1 acts as a generator. A first motor gear Gm1 secured to the output shaft of the first motor MG1, engages with the first carrier gear Gc1. A first inverter I1 is also connected to the first motor MG1. The first inverter I1 is provided with a command signal from the controller 27 for controlling the motor torque in the first motor MG1.

The second motor MG2 is configured identically the first motor MG1. A second motor gear Gm2 secured to the output shaft of the second motor MG2, engages with the first outer periphery ring gear Gr1. A second inverter I2 is also connected to the second motor MG2. The second inverter I2 is provided with a command signal from the controller 27 for controlling the motor torque in the second motor MG2.

The capacitor 64 functions as an energy storage unit storing the energy generated by the motors MG1, MG2. That is, the capacitor 64 stores the electric power generated by the motors MG1, MG2 when a large amount of electric power is generated in total between the motors MG1, MG2. The capacitor 64 also discharges electric power when a large amount of electric power is consumed in total between the motors MG1, MG2. Namely, the power stored in the capacitor 64 may be used to drive the motors MG1, MG2. Note that another storage means, such as a battery, may be used in place of the capacitor.

The controller 27 receives the detection signals from the various detectors and provides each of the inverters I1, I2 with the command signals representing a commanded torque sent to the motors MG1, MG2. Note that the controller 27 may output a rotation speed command to the motors MG1, MG2. In this case, the inverters I1, I2 calculate a commanded torque in accordance with the rotation speed command to control the motors MG1, MG2. The controller 27 may also provide the clutch control valves VF, VR, VH, VL with command signals for controlling clutch hydraulic pressure in the clutches CF, CR, CH, CL. Hereby the speed change ratio in and the output torque of the power transmission device 24 are controlled.

As illustrated in FIG. 2, the controller 27 includes a mode switching control unit 92. The mode switching control unit 92 carries out mode switching control that switches the transmission route of the drive power in the power transmission device 24 between the Hi mode and the Lo mode in accordance with the rotation speed ratio between the input shaft 61 and the output shaft 63 in the power transmission device 24. During mode switching control the mode switching control unit 92 engages or disengages the H-clutch CH and the L-clutch CL to thereby switch between Hi mode and Lo mode. The operations of the power transmission device 24 during mode switching control are described below. Here, the overall operations of the power transmission device 24 is described with reference to FIG. 4; here, the vehicle speed increases from zero to forward travel while the rotation speed of the engine 21 is kept constant.

Figure 4:
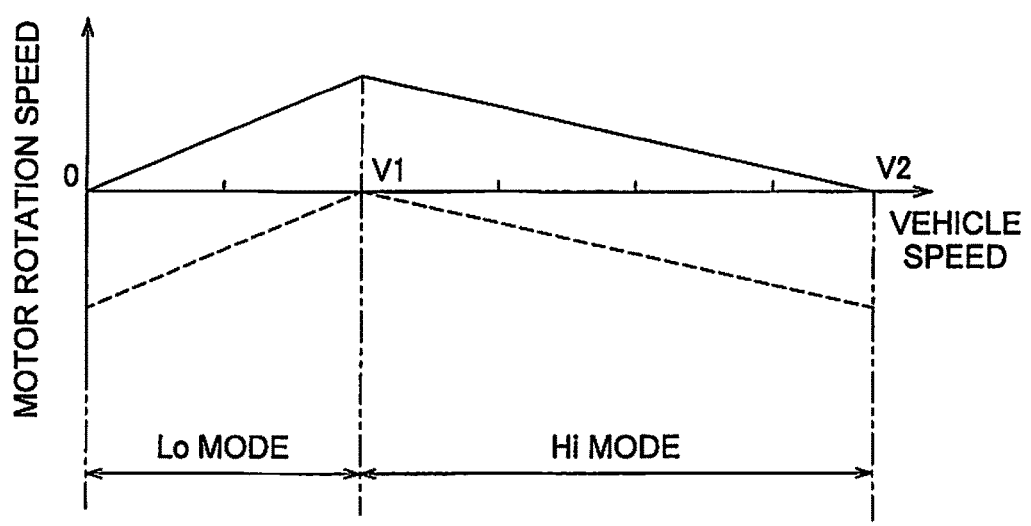
FIG. 4 illustrates the rotation speed variations of a first motor and a second motor in relation to the vehicle speed.

FIG. 4 illustrates the rotation speed of the motors MG1, MG2 in relation to the vehicle speed. The vehicle speed varies depending on the rotation speed ratio of the power transmission device 24 when the rotation speed of the engine 21 is constant. The rotation speed ratio is the proportion of the rotation speed of the output shaft 63 in relation to the rotation speed of the input shaft 61. Accordingly, the variations in the vehicle speed in FIG. 4 match the variations in the rotation speed ratio in the power transmission device 24. That is, FIG. 4 illustrates the relationship between the rotation speed in the motors MG1, MG2 and the rotation speed ratio in the power transmission device 24. The solid line in FIG. 4 represents the rotation speed of the first motor MG1, and the dotted line represents the rotation speed of the second motor MG2. The L-clutch CL is engaged and the H-clutch CH is disengaged (i.e., Lo mode) in a range where the vehicle speed is from 0 to V1 inclusive. Given that the H-clutch CH is disengaged in Lo mode, the second carrier C2 and the first ring gear R1 are also disengaged. In addition, the L-clutch CL is engaged, and therefore the second carrier C2 is fixed.

During Lo mode the drive power from the engine 21 is input into the first sun gear S1 via the power transmission shaft 67, and thereby the drive power is output from the first carrier C1 to the second sun gear S2. Whereas, the drive power input into the first sun gear S1 is transmitted from the first planetary gears P1 to the first ring gear R1, and thereby the drive power is output to the second motor MG2 via the first outer periphery ring gear Gr1 and the second motor gear Gm2. During the Lo mode the second motor MG2 acts primarily as a generator and a portion of the electric power generated by the second motor MG2 is stored in the capacitor 64. Another portion of the electric power generated by the second motor MG2 is also consumed to drive the first motor MG1. That is, the electric power generated by the second motor MG2 is consumed primarily by the first motor MG1, with a portion of that electric power stored in the capacitor 64 as needed.

Furthermore, during the Lo mode, the first motor MG1 acts primarily as an electric motor. The drive power from the first motor MG1 is output to the second sun gear S2 via the first motor gear Gm1, the first carrier gear Gc1, and the first carrier C1 respectively. The drive power output to the second sun gear S2 as above described is transmitted to the output shaft 63 via the second planetary gears P2, the second ring gear R2, the second outer periphery ring gear Gr2, and the output gear 71 respectively.

The H-clutch CH is engaged and the L-clutch CL is disengaged (i.e., Hi mode) in the region where the vehicle speed exceeds V1. Given that the H-clutch CH is engaged in Hi mode, the second carrier C2 and the first ring gear R1 are also engaged. In addition, the second carrier C2 is disengaged because the L-clutch CL is disengaged. Consequently the rotation speed of the first ring gear R1 and the second carrier C2 match.

During Hi mode the drive power from the engine 21 is input into the first sun gear S1, and thereby the drive power is output from the first carrier C1 to the second sun gear S2. Additionally, the drive power input into the first sun gear S1 is output to the first motor MG1 from the first carrier C1 via the first carrier gear Gc1 and the first motor gear Gm1. During the Hi mode the first motor MG1 acts primarily as a generator; therefore, a portion of the electric power generated by the first motor MG1 is stored in the capacitor 64. Another portion of the electric power generated by the first motor MG1 is also consumed to drive the second motor MG2. That is, the electric power generated by the first motor MG1 is consumed primarily by the second motor MG2, with a portion of that electric power stored in the capacitor 64 as needed.

The drive power from the second motor MG2 is output to the second carrier C2 via the second motor gear Gm2, the first outer periphery ring gear Gr1, the first ring gear R1, and the H-clutch CH respectively. The drive power output to the second sun gear S2 in the above-described manner is also output to the second ring gear R2 via the second planetary gears P2, and the drive power output to a second carrier C2 is output to the second ring gear R2 via the second planetary gears P2. The drive power made to coincide via the second ring gear R2 is transmitted to the output shaft 63 via the second outer periphery ring gear Gr2 and the output gear 71.

Note that although the process for driving forward travel is described above, the operations are identical for driving reverse travel. Furthermore, the responsibilities of generator or motor of the first motor MG1, and the second motor MG2 are reversed during braking.

The control of the power transmission device 24 by the controller 27 is described next. The controller 27 controls the motor torque in the first motor MG1 and in the second motor MG2 to thus control the output torque of the power transmission device 24. In other words, the controller 27 controls the motor torque in the first motor MG1 and in the second motor MG2 to thus control the traction force and the braking force of the work vehicle 1.

First, a method of setting the command value for the motor torque (hereafter, "commanded torque") sent to the first motor MG1 and the second motor MG2 is described below.

Figure 5:
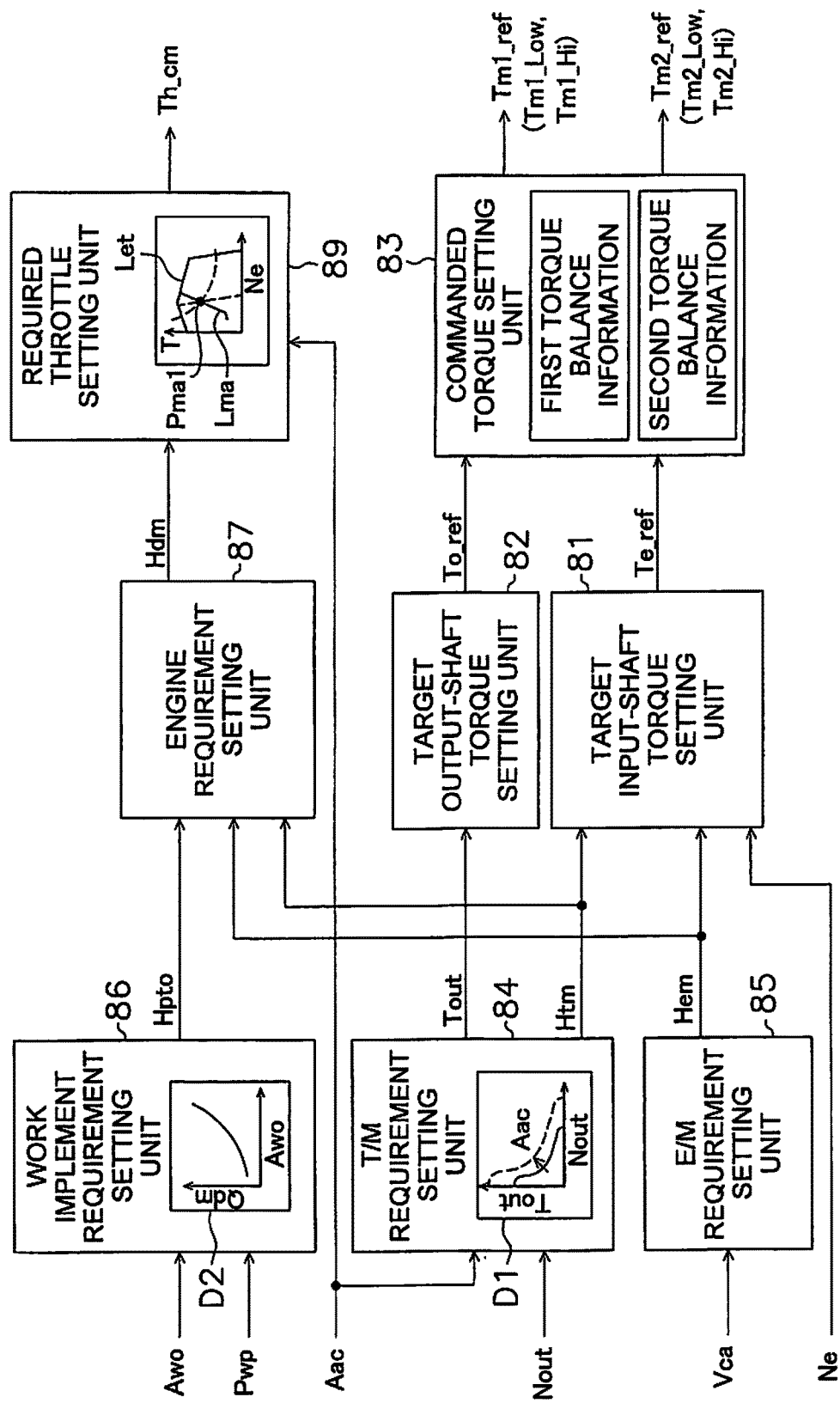
FIG. 5 is a control block diagram representing a process for determining the commanded torque sent to a motor.

FIG. 5 is a control block diagram illustrating the process carried out by the controller 27. As illustrated in FIG. 5 the controller 27 includes a transmission requirement setting unit 84, and energy management requirement setting unit 85, and a work implement requirement setting unit 86.

The transmission requirement setting unit 84 determines a required traction force Tout on the basis of an accelerator operation amount Aac and an output rotation speed Nout. More specifically the transmission requirement setting unit 84 determines the required traction force Tout from the output rotation speed Nout on the basis of a required traction force characteristic information D1 stored in the storage unit 56. The required traction force characteristic information D1 is data representing a required traction force characteristic which defines the relationship between the output rotation speed Nout and the required traction force Tout. The required traction force characteristic varies in accordance with the accelerator operation amount. The required traction force characteristic corresponds to a prescribed vehicle speed to traction force characteristic. The transmission requirement setting unit 84 uses a required traction force characteristic based on the accelerator operation amount to determine the required traction force Tout from the output rotation speed Nout, and determines a horsepower Htm required by the transmission from the product of the output rotation speed Nout and the required traction force Tout.

Figure 6:
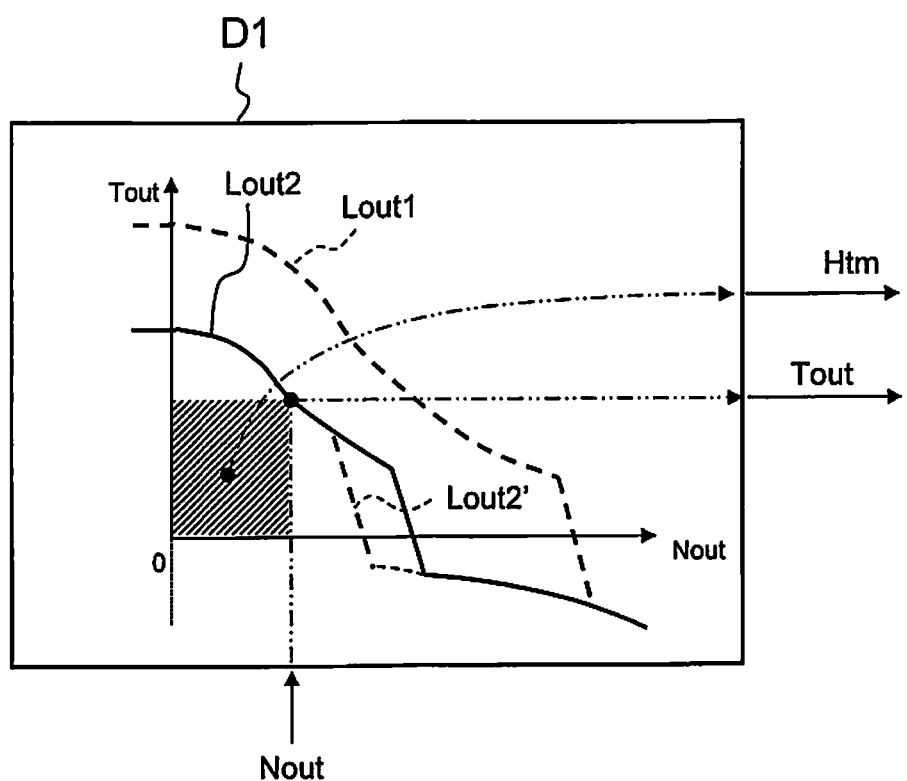
FIG. 6 is a graph illustrating one example of a required traction force characteristic.

More specifically, as illustrated in FIG. 6, the storage unit 56 stores data Lout1 representing a required traction force characteristic used as a reference ("reference traction force characteristic Lout1" below). The reference traction force characteristic Lout1 is the required traction force characteristic when the accelerator operation amount Aac is the maximum value (i.e., 100%). The reference traction force characteristic Lout1 is prescribed in accordance with a speed range selected by the speed change operation member 53a. Transmission requirements setting unit 84 determines a current required traction force characteristic Lout2 by multiplying the reference required attraction force characteristic Lout1 by a prescribed proportion based on the accelerator operation amount Aac.

Note that the required traction force characteristic information D1 defines the required traction force Tout that increases in accordance with the decrease in the output rotation speed Nout. In addition, the transmission requirement setting unit 84 changes the required traction force characteristic to correspond to the speed range selected by the speed change operation member 53a on operation of the above-described speed change operation member 53a. For example, when the speed change operation member 53a downshifts, the required traction force characteristic information changes from Lout2 to Lout2'. Hereby, the upper limit value of the output rotation speed Nout decreases. Namely, the upper limit value of the vehicle speed decreases.

The required traction force characteristic information D1 also defines the required traction force Tout that is a negative value in relation to the output rotation speed Nout that is equal to or greater than a prescribed speed. Therefore, when the output rotation speed Nout is greater than the upper limit value of an output rotation speed in the speed range selected, the required traction force Tout is set to a negative value. Braking is initiated when the required traction force Tout is a negative value. A behavior identical to the engine brake that occurs in a torque converter type transmission device can be implemented in the EMT type power transmission device 24.

The energy management requirement setting unit 85 illustrated in FIG. 5 determines the horsepower Hem required for energy management on the basis of the amount of electric power remaining in the capacitor 64. The horsepower Hem required for energy management is the horsepower the power transmission device 24 needs to charge the capacitor 64. For instance, the energy management requirement setting unit 85 may determine the current capacitor charge amount from the voltage Vca of the capacitor 64. The smaller the current capacitor charge amount, the larger the energy management requirement setting unit 85 sets the horsepower Hem required for energy management.

The work implement requirement setting unit 86 determines the horsepower Hpto required by the work implement on the basis of the work implement pump pressure Pwp and an operation amount Awo of the work implement operation member 52a (termed "work implement operation amount Awo" below). In the embodiment the horsepower Hpto required by the work implement is distributed to the work implement pump 23. However, the horsepower Hpto required by the work implement may include horsepower distributed to the steering pump 30 and/or the transmission pump 29.

More specifically, the work implement requirement setting unit 86 determines a required flow rate Qdm in the work implement pump 23 from the work implement operation amount Awo on the basis of a required flow rate information D2. The required flow rate information D2 stored in the storage unit 56 defines the relationship between the required flow rate Qdm and the work implement operation amount Awo. The work implement requirement setting unit 86 determines the horsepower Hpto required by the work implement from the required flow rate Qdm and the work implement pump pressure Pwp.

The controller 27 includes a target output-shaft torque setting unit 82, a target input-shaft torque setting unit 81, and a commanded torque setting unit 83.

The target output-shaft torque setting unit 82 determines a target output-shaft torque To_ref. The target output-shaft torque To_ref is a target value for the torque output from the power transmission device 24. The target output-shaft torque setting unit 82 determines the target output-shaft torque To_ref on the basis of the required traction force Tout determined by the transmission requirement setting unit 84. More specifically, the target output-shaft torque To_ref is determined by multiplying the required traction force Tout by a prescribed distribution rate. The prescribed distribution rate may be established, for instance, so that a total of the horsepower Hpto required by the work implement, the horsepower Htm required by the transmission, and the horsepower Hem required for energy management does not exceed the amount of horsepower output from the engine 21.

The target input-shaft torque setting unit 81 determines a target input-shaft torque Te_ref. The target input-shaft torque Te_ref is a target value for the torque entering the power transmission device 24. The target input-shaft torque setting unit 81 determines the target input-shaft torque Te_ref on the basis of the horsepower Htm required by the transmission and the horsepower Hem required for energy management. More specifically, the target input-shaft torque setting unit 81 computes the target input-shaft torque Te_ref by multiplying the horsepower Htm required by the transmission by the prescribed distribution rate, adding the result thereof to the horsepower Hem required for energy management, and multiplying the resulting summation by the engine rotation speed. Note that the horsepower Htm required by the transmission may be computed by multiplying the above-described required traction force Tout by the current output rotation speed Nout.

The commanded torque setting unit 83 uses torque balance information to determine commanded torques Tm1_ref, Tm2_ref for the motors MG1, MG2 from the target input-shaft torque Te_ref and the target output-shaft torque To_ref. The torque balance information defines a relationship between a target input-shaft torque Te_ref and a target output-shaft torque To_ref which balances the torque within the power transmission device 24. The torque balance information is stored in the storage unit 56.

As above described, the transmission routes for the drive power in the power transmission device 24 differs in the Lo mode and the Hi mode. Therefore, the commanded torque setting unit 83 uses different torque balance information between in the Lo mode and the Hi mode respectively to determine the commanded torques Tm1_ref, Tm2_ref for the motors MG1, MG2. More specifically, the commanded torque setting unit 83 uses first torque balance information represented by the following Formula 1 to determine the commanded torques Tm1_Low, Tm2_Low for the motors MG1, MG2 during the Lo mode. In the exemplary embodiment, the first torque balance information is a formula that balances the torque in the power transmission device 24.

$Ts1\_Low = Te\_ref * r\_fr$ $Tc1\_Low = Ts1\_Low * (-1) * ((Zr1/Zs1)+1)$ $Tr2\_Low = To\_ref * (Zod/Zo)$ $Ts2\_Low = Tr2\_Low * (Zs2/Zr2)$ $Tcp1\_Low = Tc1\_Low + Ts2\_Low$ $Tm1\_Low = Tcp1\_Low * (-1) * (Zp1/Zp1d)$ $Tr1\_Low = Ts1\_Low * (Zr1/Zs1)$ $Tm2\_Low = Tr1\_Low * (-1) * (Zp2/Zp2d)$     Formula 1

The commanded torque setting unit 83 also uses second torque balance information represented by the following Formula 2 to determine the commanded torques Tm1_Hi, Tm2_Hi for the motors MG1, MG2 during the Hi mode. In the exemplary embodiment, the second torque balance information is a formula that balances the torque in the power transmission device 24.

$Ts1\_Hi = Te\_ref * r\_fr$ $Tc1\_Hi = Ts1\_Hi * (-1) * ((Zr1/Zs1)+1)$ $Tr2\_Hi = To\_ref * (Zod/Zo)$ $Ts2\_Hi = Tr2\_Hi * (Zs2/Zr2)$ $Tcp1\_Hi = Tc1\_Hi + Ts2\_Hi$ $Tm1\_Hi = Tcp1\_Hi * (-1) * (Zp1/Zp1d)$ $Tr1\_Hi = Ts1\_Hi * (Zr1/Zs1)$ $Tc2\_Hi = Tr2\_Hi * (-1) * ((Zs2/Zr2)+1)$ $Tcp2\_Hi = Tr1\_Hi + Tc2\_Hi$ $Tm2\_Hi = Tcp2\_Hi * (-1) * (Zp2/Zp2d)$     Formula 2

The particulars of the parameters used in the first and second torque balance information is represented in the following Table 1.

TABLE 1

| | |
|---|---|
| Te_ref | Target Input-Shaft Torque |
| To_ref | Target Output-Shaft Torque |
| r_fr | Speed Reduction Ratio in FR switching mechanism 65 (The FR switching mechanism 65 reduces the engine speed by $1/r\_fr$ and outputs the result. When the FR switching mechanism 65 is in forward travel, r_fr is a negative value. When the FR switching mechanism 65 is in reverse travel, r_fr is a positive value. |
| Zs1 | Number of gears in the sun gear S1 in the first planetary gear mechanism 68 |
| Zr1 | Number of gears in the ring gear R1 in the first planetary gear mechanism 68 |
| Zp1 | Number of gears in first carrier gear Gc1 |
| Zp1d | Number of gears in first motor gear Gm1 |
| Zs2 | Number of gears in the sun gear S2 in the second planetary gear mechanism 69 |
| Zr2 | Number of gears in the ring gear R2 in the second planetary gear mechanism 69 |
| Zp2 | Number of gears in the first outer periphery ring gear Gr1 |
| Zp2d | Number of gears in second motor gear Gm2 |
| Zo | Number of gears in the second outer periphery ring gear Gr2 |
| Zod | Number of gears in the output gear 71 |

The details regarding the control of the engine 21 by the controller 27 are described next. As above described, controller 27 sends command signals to the fuel injector 28 to control the engine 21. A method of determining a commanded throttle value sent to the fuel injector 28 is described below. The controller 27 includes an engine requirement setting unit 87 and a required throttle setting unit 89.

The engine requirement setting unit 87 determines a horsepower Hdm required from the engine on the basis of the horsepower Hpto required by the work implement, the horsepower Htm required by the transmission, and the horsepower Hem required for energy management. More specifically, the engine requirement setting unit 87 sums the horsepower Hpto required by the work implement, the horsepower Htm required by the transmission, and the horsepower Hem required for energy management to determine the horsepower Hdm required from the engine.

The required throttle setting unit 89 determines a commanded throttle value Th_cm from the horsepower Hdm required from the engine, and the accelerator operation amount Aac. The required throttle setting unit 89 determines the commanded throttle value Th_cm using an engine torque line Let and a matching line Lma which are stored in the storage unit 56. The engine torque line Let defines the relationship between the output torque of the engine 21 and the engine rotation speed Ne. The matching line Lma is used to determine a first required throttle value from the horsepower Hdm required from the engine.

The required throttle setting unit 89 determines a first required throttle value so that the engine torque line Let and the matching line Lma match at a matching point Pma1, which is where the output torque of the engine 21 is, the torque corresponding to the horsepower Hdm required from the engine. The required throttle setting unit 89 then selects the smaller of the first required throttle value and a second required throttle value that corresponds to the accelerator operation amount Aac as the commanded throttle value Th_cm.

The control performed when the FR operation member 54a is switched to a neutral position (termed "neutral control" below) is described next. As illustrated in FIG. 2, the controller 27 includes a neutral control determination unit 93. The neutral control determination unit 93 executes quasi-neutral control when a quasi-neutral control determination condition is satisfied. The neutral control determination unit 93 executes real neutral control when a real neutral control determination condition is satisfied. In quasi-neutral control, the commanded torque sent to the motors MG1, MG2 is controlled while the F-clutch CF or the R-clutch CR is kept engaged to thereby simulate a neutral state where the output torque from the power transmission device 24 to the travel device 25 is kept at a prescribed value regardless of the drive power output from the engine 21. In real neutral control the F-clutch CF and the R-clutch CR are disengaged to realize the neutral state.

Figure 7:
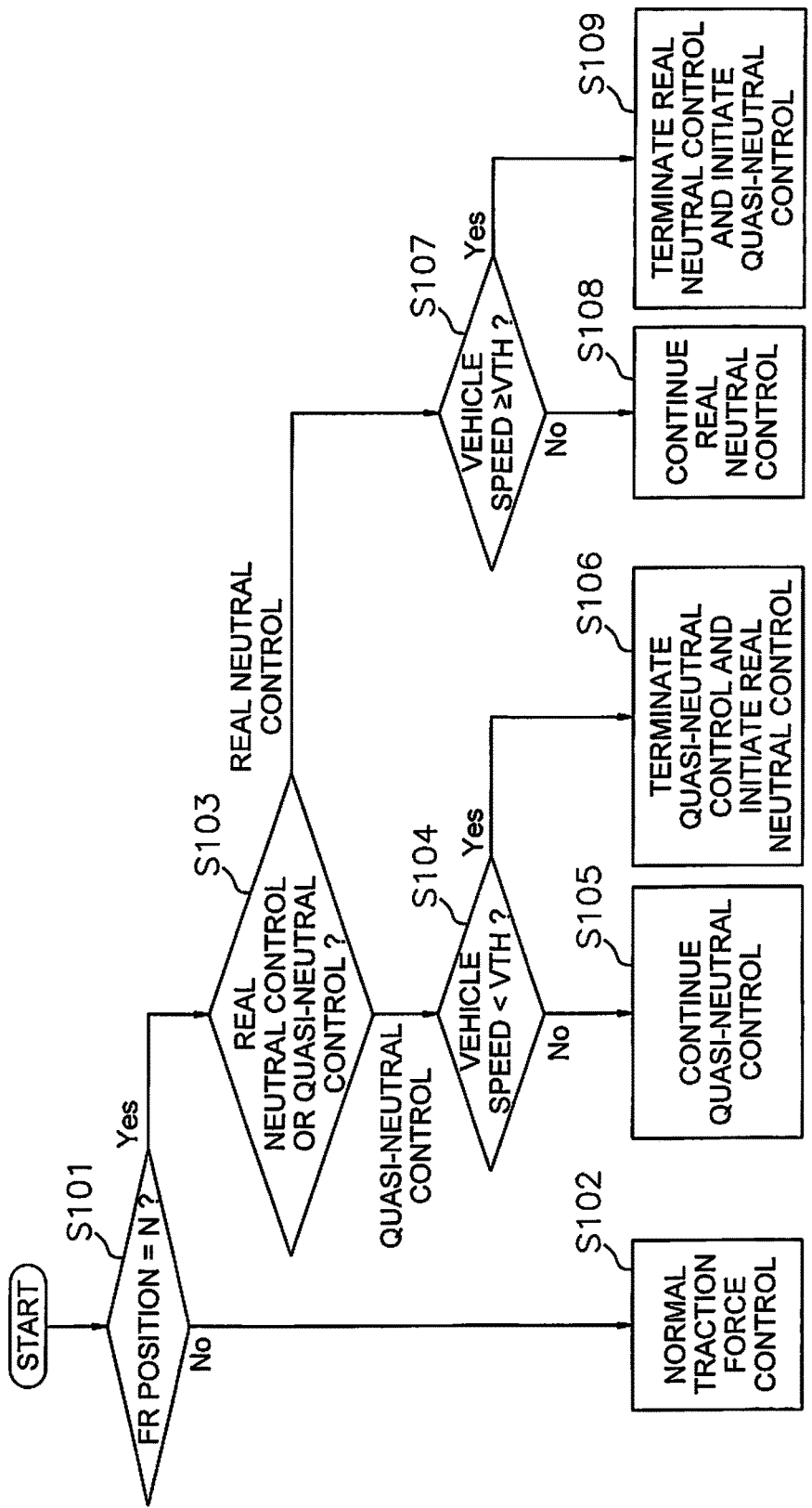
FIG. 7 is a flowchart illustrating how executing quasi-neutral control and real neutral control is determined.

FIG. 7 is a flowchart illustrating the neutral control by the neutral control determination unit 93. As illustrated in FIG. 7, in step S101 the neutral control determination unit 93 assesses whether or not the FR operation member 54a is in a neutral position. Processing continues to normal traction force control in step S102 when the FR operation member 54a is not in the neutral position. Normal traction force control involves controlling the traction force when neither quasi-neutral control nor real neutral control are being carried out, i.e. The traction force is controlled using the reference traction force characteristic Lout1 illustrated in the above FIG. 6.

Processing at step S101 continues to step S103 when the FR operation member 54a is in the neutral position. In step S103 it is determined which neutral control, that is real neutral control or quasi-neutral control is currently being executed. If quasi-neutral control is being executed, processing continues to step S104.

In step S104 it is determined whether or not the vehicle speed is less than a prescribed speed threshold Vth. When the vehicle speed is not less than the prescribed speed threshold Vth, that is, when the vehicle speed is greater than or equal to the prescribed speed threshold Vth, processing continues to step S105 to continue quasi-neutral control. In step S104, if the vehicle speed is less than the prescribed speed threshold Vth, processing continues to step S106 where quasi-neutral control is terminated and real natural control is initiated. Accordingly, when the vehicle speed changes from a value greater than or equal to the prescribed speed threshold Vth to a value less than the prescribed speed threshold while the quasi-neutral control determination condition is satisfied, the neutral control determination unit 93 may switch the neutral control from quasi-neutral control to real neutral control.

When real neutral control is being executed at step S103, processing jumps to step S107. In step S107 it is determined whether or not the vehicle speed is greater than or equal to a prescribed speed threshold Vth. When the vehicle speed is not greater than or equal to the prescribed speed threshold Vth, that is, when the vehicle speed is less than the prescribed speed threshold Vth, processing jumps to step S108 to continue real neutral control. In step S107, if the vehicle speed is greater than or equal to the prescribed speed threshold Vth, processing continues to step S109 where real neutral control is terminated and quasi-neutral control is initiated. Accordingly, when the vehicle speed changes from a value less than the prescribed speed threshold Vth to a value greater than or equal to the prescribed speed threshold Vth while the real neutral control determination condition is satisfied, the neutral control determination unit 93 may switch the neutral control from real neutral control to quasi-neutral control. At this point the FR clutch control unit 91 selects the one of the F-clutch CF and the R-clutch CR to be engaged, and synchronizes and then engages that clutch. The clutch to be engaged that is one of the F-clutch CF and the R-clutch CR, is the clutch corresponding to the travel direction of the vehicle. Additionally, synchronizing the clutch may involve modulating the hydraulic pressure in the clutch and then engaging the clutch. Alternatively, the clutch may be synchronized by controlling the relative rotation speed of the clutch to coincide (synchronize) to within a prescribed rotation speed possible for engaging the clutch, after which the clutch is engaged. Hereby, the shock generated when engaging the F-clutch CF and the R-clutch CR may be suppressed.

As above described, the quasi-neutral control determination condition may include that the FR operation member 54a is in the neutral position, and that the vehicle speed is equal to or greater than the prescribed speed threshold Vth. Note that quasi-neutral control is executed when both these conditions are satisfied. During quasi-neutral control the FR clutch control unit 91 keeps either the F-clutch CF or the R-clutch CR engaged. That is, the FR clutch control unit 91 maintains the F-clutch CF and the R-clutch CR in the state the F-clutch CF and the R-clutch CR were in before the FR operation member 54a was switched to the neutral position.

Figure 8:
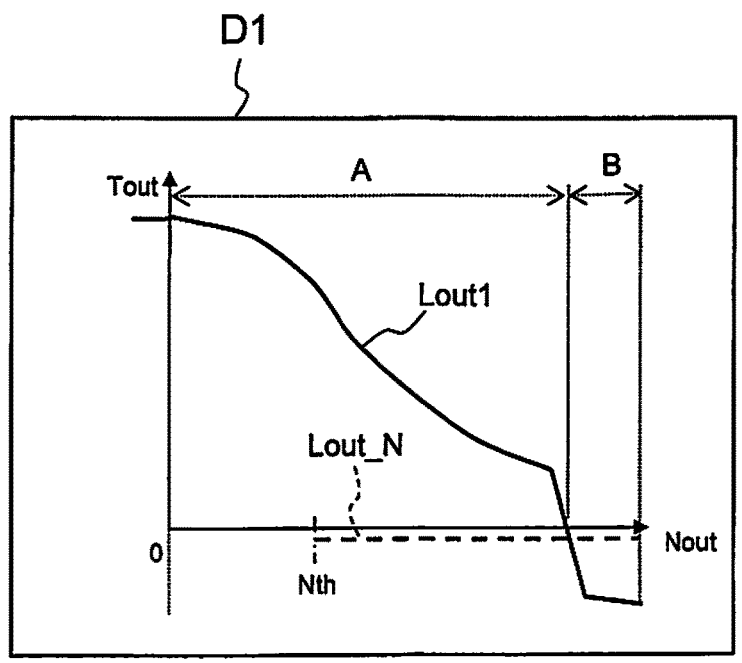
FIG. 8 is a graph illustrating one example of a required traction force characteristic.

Similarly to normal traction force control, the mode switching control unit 92 executes mode switching control even during quasi-neutral control. Additionally, the commanded torque setting unit 83 determines a commanded torque sent to the motors MG1, MG2 so that regardless of the drive power output from the engine 21, the output torque from the power transmission device 24 to the travel device 25 is kept at a prescribed value during quasi-neutral control. More specifically, the commanded torque setting unit 83 uses the above described method of determining a commanded torque sent to the motors MG1, MG2 to determine the commanded torque sent to the motors MG1, MG2 on the basis of a second required traction force characteristic Lout_N illustrated in FIG. 8. As illustrated in FIG. 8, a required traction force characteristic information D1 includes a first required traction force characteristic Lout1 and a second required traction force characteristic Lout_N.

The first required traction force characteristic Lout1 is the above-described reference traction force characteristic Lout1 which defines the relationship between the output rotation speed and the required traction force during normal driving control (i.e., the above described normal traction force control). The second required traction force characteristic Lout_N defines the relationship between the output rotation speed and the required traction force during quasi-neutral control. As illustrated in FIG. 8, the first required traction force characteristic Lout1 includes a region A wherein a traction force is generated (termed "traction force region A" below), and a region B where a deceleration force is generated (termed "engine braking region B" below). The required traction force defined by the second required traction force characteristic Lout_N is smaller than the required traction force defined by the first required traction force characteristic Lout1 in the traction force region A. The required traction force Tout is a tiny negative value in the second required traction force characteristic Lout_N. Accordingly, the second required traction force characteristic Lout_N may be established to generate a deceleration force in the work vehicle 1. The deceleration force defined by the second required traction force characteristic Lout_N may preferably be smaller than the deceleration force defined by the first required traction force characteristic Lout1 in the engine braking region B. For instance, as illustrated in FIG. 8, the deceleration force defined by the second required traction force characteristic Lout_N is smaller than the maximum value of the deceleration force defined by the first required traction force characteristic Lout1 in the engine braking region B.

The required traction force Tout is a constant value in the second required traction force characteristic Lout_N regardless of the output rotation speed Nout. Additionally, as above described, although the first required traction force characteristic Lout1 changes depending on the accelerator operation amount, the second required traction force characteristic Lout_N does not change depending on the accelerator operation amount. Note that Nth in FIG. 8 represents the output rotation speed corresponding to the above-mentioned speed threshold Vth.

In contrast, the real neutral control determination condition includes that the FR operation member 54a is in the neutral position, and that the vehicle speed is less than the prescribed speed threshold Vth. Note that real neutral control is executed when both these conditions are satisfied. During real neutral control the FR clutch control unit 91 keeps the F-clutch CF and the R-clutch CR disengaged. Additionally, the commanded torque setting unit 83 sets the commanded torque sent to the first motor MG1 and to the second motor MG2 to zero during real neutral control.

A work vehicle 1 according to the exemplary embodiment has the following features.

In the work vehicle 1 according to the exemplary embodiment, quasi-neutral control provides a simulated neutral state, where the output torque from the power transmission device 24 to the travel device 25 is suppressed to a predetermined value regardless of the drive power output from the engine 21 while the F-clutch CF or R-clutch CR is kept engaged. Accordingly, compared to having the F-clutch CF, the R-clutch CR, the L-clutch CL, and the H-clutch CH disengaged, the time required to drive the clutches via hydraulic pressure or to synchronize the clutches is no longer needed. Thus, the transmission of drive power may be initiated quickly when switching the power transmission device 24 from the neutral state to the forward-travel state or the reverse-travel state.

Additionally, during quasi-neutral control the drive power from the engine 21 is transmitted to the motors MG1, MG2 because either the F-clutch CF or the R-clutch CR is engaged. Therefore, even during quasi-neutral control, the drive power from the engine 21 causes the motors MG1, MG2 to act as electric generators. Note that the electrical energy generated can be stored in the capacitor 64. Thus, discharging the stored electrical energy at the desired time may reduce the load on the engine.

Moreover, the motors MG1, MG2 are connected to the output shaft 63 even if both the F-clutch CF and the R-clutch CR are disengaged when the FR switching mechanism 65 is located between the input shaft 61 and the first planetary gear mechanism 68 along the transmission route for the drive power. Accordingly, the rotation of the output shaft 63 rotates the motors MG1, MG2. Therefore, the rotation speed of the motor MG1, MG2 must always be controlled to prevent the motors MG1, MG2 from over rotating. However, the work vehicle 1 according to the exemplary embodiment uses quasi-neutral control to realize a neutral state while keeping the F-clutch CF or the R-clutch CR engaged. Thus, there is no need for the above-describe kind of control of the rotation speed of the motors MG1, MG2 to prevent over rotating of the motors, thereby simplifying control of the motors MG1, MG2.

The quasi-neutral control determination condition includes that the vehicle speed is equal to or greater than a prescribed speed threshold Vth. Thus, the transmission of drive power may be initiated quickly in situations where the operator desires a prompt increase or a prompt decrease in speed when the work vehicle is running.

When the vehicle speed is smaller than the prescribed speed threshold Vth when the FR operation member 54*a* is switched to the neutral position, real neutral control is executed instead of quasi-neutral control. During real neutral control the FR clutch control unit 91 keeps the F-clutch CF and the R-clutch CR disengaged. Thus, the transmission of drive power may be more reliably blocked in situations where the operator does not wish for a prompt increase or a prompt decrease in speed, such as while the work vehicle 1 is stopped, or immediately before the work vehicle 1 is to stop.

When the vehicle speed changes from a value less than the prescribed speed threshold Vth to a value greater than or equal to the prescribed speed threshold Vth while the real neutral control determination condition is satisfied, control can be switched from real neutral control to quasi-neutral control. Thus, the transmission of drive power may be initiated quickly after a large increase in the vehicle speed when the FR operation member 54*a* is switched from the neutral position to a forward-travel position or a reverse-travel position.

The commanded torque sent to the motors MG1, MG2 are determined on the basis of the second required traction force characteristic Lout_N during quasi-neutral control. Therefore the traction force can be controlled during quasi-neutral control. Additionally, the second required traction force characteristic Lout_N may be established to generate a deceleration force in the work vehicle 1. Thus, the traction force of the work vehicle 1 may be controlled so that a deceleration force is generated during quasi-neutral control.

Although the first required traction force characteristic Lout1 changes depending on the accelerator operation amount, the second required traction force characteristic Lout_N does not change depending on the accelerator operation amount. Consequently, even when the operator manipulates the accelerator operation member 51*a* during quasi-neutral control, the drive power does not generate in response to operation of the accelerator operation member 51*a*.

The mode switching control unit 92 carries out mode switching control even during quasi-neutral control. Therefore, even during quasi-neutral control a suitable mode may be selected depending on the rotation speed ratio. Hereby, the motors MG1, MG2 in the power transmission device 24 may be prevented from over rotating during quasi-neutral control.

Figure 9:
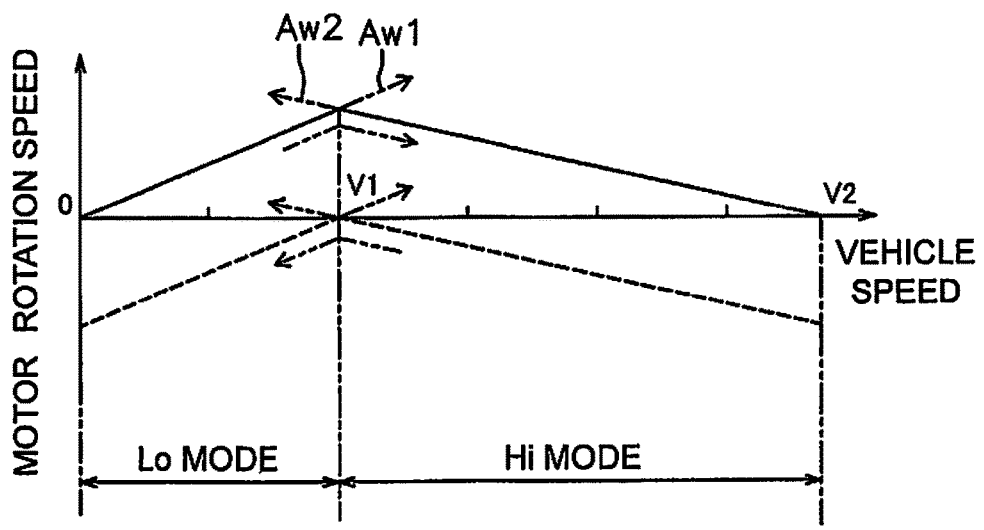
FIG. 9 illustrates the rotation speed variations of a first motor and a second motor in relation to the vehicle speed.

For instance, FIG. 9 illustrates the variations in the rotation speeds of the motors MG1, MG2 when no mode switching control takes place during the quasi-neutral control (refer to the double-dashed arrows). As illustrated by the arrow Aw1, the rotation speed of the first motor MG1 continues to increase when the transmission route for the drive power is maintained in the Lo mode regardless of the vehicle speed changing from a value less than V1 to a value equal to or greater than V1. Once the vehicle speed increases further, the first motor MG1 starts over rotating. Similarly, as illustrated by the arrow Aw2, the rotation speed of the first motor MG1 continues to increase when the transmission route for the drive power is maintained in the Hi mode regardless of the vehicle speed changing from a value equal to or greater than V1 to a value less than V1. Once the vehicle speed decreases further, the first motor MG1 starts over rotating.

In contrast, the work vehicle 1 according to the exemplary embodiment performs mode switching control during quasi-neutral control to select a mode suitable for the rotation speed ratio. Hereby, the motors MG1, MG2 in the power transmission device 24 may be prevented from over rotating.

The present invention is not limited to the exemplary embodiment such as above described, and may be modified or revised in various ways without deviating from the scope of the invention.

The present invention is not limited to the above described wheel loader, and may be adopted in another type of work vehicle, such as a bulldozer, a tractor, a forklift or a motor grader.

The present invention is not limited to an EMT and may be adopted in another type of speed changing device, such as an HMT. In this case, the first motor MG1 would function as a hydraulic motor and a hydraulic pump. The second motor MG2 would also function as a hydraulic motor and a hydraulic pump. The first motor MG1 and the second motor MG2 are variable displacement pump-motors where the controller 27 controls the tilt angle of the swashplate or the tilt axis to control the capacity thereof. Further the capacity of the first motor MG1 and the second motor MG2 may be controlled so that a commanded torque Tm1_ref, Tm2_ref computed identically as in the above-mentioned exemplary embodiment is output.

The configuration of the power transmission device 24 is not limited to the configuration in the above-mentioned exemplary embodiment. For instance, the linkages between and arrangements of each of the elements in the two planetary gear mechanisms 68, 69 are not limited to the linkages and arrangements in the above-mentioned exemplary embodiment. Additionally, the power transmission device 24 is not limited to being equipped with two planetary gear mechanisms. The power transmission device 24 may have only one planetary gear mechanism. Alternatively, the power transmission device 24 may have three or more planetary gear mechanisms.

The configuration of the power transmission device 24 is not limited to the configuration in the above-mentioned exemplary embodiment. In other words, in the above exemplary embodiment, a target input-shaft torque Te_ref and a target output-shaft torque To_ref are determined to obtain a prescribed vehicle speed-tractive force characteristics that the traction force continuously changes in accordance with the vehicle speed. However, the target input-shaft torque Te_ref and the target output-shaft torque To_ref may be established in any desired manner.

The torque balance information is not limited to an expression that balances the torque as in the above exemplary embodiment. For instance, the torque balance information may be in another format such as a table or a map.

The quasi-neutral control determination condition is not limited to the above-described two criteria. The quasi-neutral control determination condition may be only that the forward-reverse operation member is in the neutral position. In this case only quasi-neutral control is carried out, without carrying out real neutral control. Alternatively, the quasi-neutral control determination condition may have a separate criteria in addition to the above-described two conditions.

The real neutral control determination condition is not limited to the above-described two criteria. For instance, the real neutral control determination condition may have a separate criteria in addition to the above-described two conditions.

The method of determining the commanded torque during quasi-neutral control is not limited to the above-described method. For instance, the commanded torque setting unit 83 may set the commanded torque sent to the motors MG1, MG2 during quasi-neutral control to zero, or to a tiny prescribed value that offsets the internal inertia of the motors MG1, MG2. In this case, setting the commanded torque sent to the motor to zero or the tiny prescribed value allows the traction force of the work vehicle 1 to be kept small during quasi-neutral control. Hereby, a neutral state may be realized where the output torque from the power transmission device 24 to the travel device 25 may be kept at a prescribed value regardless of the drive power output from the engine 21.

The second required traction force characteristic Lout_N is not limited to the above-described constant value that generates a deceleration force, the second required traction force characteristic Lout_N may be variable. For instance, the second required traction force characteristic Lout_N may be established to generate a traction force and not a deceleration force. The second required traction force characteristic Lout_N may also define the required traction force Tout which changes depending on the output rotation speed Nout.

The arrangement of the forward-reverse switching mechanism is not limited to the above kind of arrangement of being arranged between the input shaft 61 and the motors MG1, MG2 along the transmission route for the drive power. The forward-reverse switching mechanism may be arranged between the axle and the motors MG1, MG2 along the transmission route for the drive power.

According to the exemplary embodiments of the present invention, a work vehicle and a method of controlling the same may be provided whereby the transmission of drive power may be initiated quickly when the power transmission device is switched from a neutral state to a forward-travel state or to a reverse-travel state.

The invention claimed is:

1. A work vehicle comprising:
an engine;
a hydraulic pump driven by the engine;
a work implement driven by hydraulic fluid discharged from the hydraulic pump;
a travel device driven by the engine;
a power transmission device for transmitting drive power from the engine to the travel device;
a controller for controlling the power transmission device; and
a forward-reverse operation member configured to selectively switch between a forward-travel position, a reverse-travel position, and a neutral position for switching the vehicle between a forward travel state, a reverse travel state, and a neutral state;
the power transmission device including
an input shaft;
an output shaft;
a gear mechanism including a planetary gear mechanism for transmitting the rotation of the input shaft to the output shaft;
a motor connected to a rotational element in the planetary gear mechanism; and
a forward-reverse switching mechanism containing a forward-travel clutch and a reverse-travel clutch configured such that during forward travel of the vehicle the forward-travel clutch is engaged and the reverse-travel clutch is disengaged, and during reverse travel of the vehicle, the forward-travel clutch is disengaged and the reverse-travel clutch is engaged;
the power transmission device being configured so that varying a rotation speed of the motor varies a rotation speed ratio of the output shaft to the input shaft;
the controller including a neutral control determination unit for determining carrying out quasi-neutral control when a quasi-neutral control determination condition is satisfied, including the forward-reverse operation member being in the neutral position;
a forward-reverse clutch control unit for keeping the forward-travel clutch or the reverse-travel clutch engaged during the quasi-neutral control; and
a commanded torque setting unit for determining a commanded torque sent to the motor so that a neutral state is set during quasi-neutral control where an output torque from the power transmission device to the travel device is kept at a prescribed value regardless of the drive power output from the engine.

2. The work vehicle according to claim 1, wherein
the quasi-neutral control determination condition further includes that the vehicle speed is equal to or greater than a prescribed speed threshold.

3. The work vehicle according to claim 2, wherein
the neutral control determination unit determines execution of real neutral control when a real neutral control determination condition including that the forward-reverse operation member is in the neutral position, and that the vehicle speed is less than the prescribed speed threshold is satisfied; and
during real neutral control the forward-reverse clutch control unit disengages the forward-travel clutch and the reverse-travel clutch.

4. The work vehicle according to claim 3, wherein
when the vehicle speed changes from a value less than the prescribed speed threshold to a value greater than or equal to the prescribed speed threshold while the real neutral control determination condition is satisfied, the neutral control determination unit switches from real neutral control to quasi-neutral control.

5. The work vehicle according to claim 4, wherein
the forward-reverse clutch control unit synchronizes and then engages the forward-travel clutch or the reverse-travel clutch when switching from real neutral control to quasi-neutral control.

6. A work vehicle according to claim 1, further comprising
an output rotation speed detector for detecting an output rotation speed that is a rotation speed of the output shaft in the power transmission device; and
the controller further including a storage unit that stores a required traction force characteristic information defining the relationship between the output rotation speed and a required traction force;
the commanded torque setting unit determining a commanded torque sent to the motor to obtain the required traction force corresponding to the output rotation speed; and
the required traction force characteristic information including a first required traction force characteristic defining a relationship between the output rotation speed and the required traction force during a normal driving control where no quasi-neutral control is carried out, and a second required traction force characteristic defining the relationship between the output rotation speed and the required traction force during quasi-neutral control.

7. The work vehicle according to claim 6, wherein
the second required traction force characteristic is established to generate a deceleration force in the work vehicle.

8. The work vehicle according to claim 6, further comprising
an accelerator operation member; and
an acceleration operation detector for detecting an operation amount of the accelerator operation member;
the first required traction force characteristic varying in accordance with the operation amount of the accelerator operation member; and
the second required traction force characteristic not varying in accordance with the operation amount of the accelerator operation member.

9. The work vehicle according to claim 1, wherein
the commanded torque setting unit sets the commanded torque sent to the motor during quasi-neutral control to zero, or to a prescribed value that offsets the internal inertia of the power transmission device.

10. The work vehicle according to claim 1, further comprising
an energy storage device;
the motor functioning as either an electric motor or an electric generator depending on a travel state of the work vehicle; and
the energy storage device storing electrical energy generated by the motor.

11. The work vehicle according to claim 1, wherein
the forward-reverse switching mechanism is located between the engine and the motor along a transmission route for the drive power.

12. The work vehicle according to claim 1, wherein
the power transmission device further includes a mode switching clutch for switching the transmission route for the drive power in the power transmission device between a high-speed mode and low-speed mode; and
the controller further includes a mode switching control unit for carrying out mode switching control that switches between engaging and disengaging a mode selection clutch depending on the rotation speed ratio; and
the mode switching control unit carries out mode switching control even during quasi-neutral control.

13. A method of controlling a work vehicle, the work vehicle being equipped with
an engine;
a hydraulic pump driven by the engine;
a work implement driven by hydraulic fluid discharged from the hydraulic pump;
a travel device driven by the engine;
a power transmission device for transmitting drive power from the engine to the travel device;
a forward-reverse operation member configured to selectively switch between a forward-travel position, a reverse-travel position, and a neutral position for switching the vehicle between a forward travel, a reverse travel, and a neutral state;
the power transmission device including
an input shaft;
an output shaft;
a gear mechanism including a planetary gear mechanism for transmitting the rotation of the input shaft to the output shaft;
a motor connected to a rotational element in the planetary gear mechanism; and
a forward-reverse switching mechanism containing a forward-travel clutch and reverse-travel clutch configured such that during forward travel of the vehicle the forward-travel clutch is engaged and the reverse-travel clutch is disengaged, and during reverse travel of the vehicle, the forward-travel clutch is disengaged and the reverse-travel clutch is engaged;
the power transmission device being configured so that varying a rotation speed of the motor varies a rotation speed ratio of the output shaft to the input shaft,
the method of control comprising the steps of:
determining carrying out quasi-neutral control when a quasi-neutral control determination condition is satisfied, including the forward-reverse operation member being in the neutral position;
keeping the forward-travel clutch or the reverse-travel clutch engaged during the quasi-neutral control; and
determining a commanded torque sent to the motor so that a neutral state is set during quasi-neutral control where an output torque from the power transmission device to the travel device is kept at a prescribed value regardless of the drive power output from the engine.

* * * * *